(12) United States Patent
DeWitt

(10) Patent No.: US 9,840,853 B1
(45) Date of Patent: Dec. 12, 2017

(54) EDGING AND VEGETATION GUARD FOR CHAIN LINK FENCES

(71) Applicant: Ronald A. DeWitt, Corpus Christi, TX (US)

(72) Inventor: Ronald A. DeWitt, Corpus Christi, TX (US)

( * ) Notice: Subject to any disclaimer, the term of this patent is extended or adjusted under 35 U.S.C. 154(b) by 0 days.

(21) Appl. No.: 15/449,903

(22) Filed: Mar. 3, 2017

Related U.S. Application Data

(60) Provisional application No. 62/303,375, filed on Mar. 4, 2016.

(51) Int. Cl.
 *E04H 17/06* (2006.01)
 *A01G 1/08* (2006.01)

(52) U.S. Cl.
 CPC .............. *E04H 17/063* (2013.01); *A01G 1/08* (2013.01)

(58) Field of Classification Search
 CPC .......... E04H 17/06; E04H 17/063; A01G 1/08
 See application file for complete search history.

(56) References Cited

U.S. PATENT DOCUMENTS

| | | | |
|---|---|---|---|
| 3,713,624 A | 1/1973 | Niemann | |
| 4,321,769 A * | 3/1982 | Tisbo | A01G 1/08 47/33 |
| 4,497,472 A | 2/1985 | Johnson | |
| 4,515,349 A | 5/1985 | Groves | |
| 4,548,388 A | 10/1985 | Cobler | |
| 4,663,883 A * | 5/1987 | Hilliard | A01G 1/08 47/33 |
| 4,690,382 A * | 9/1987 | Koperdak | E04H 17/063 256/1 |
| 4,903,947 A * | 2/1990 | Groves | A01G 1/08 256/1 |
| 4,907,783 A | 3/1990 | Fisk et al. | |
| 4,964,619 A * | 10/1990 | Glidden, Jr. | E04H 17/063 256/32 |
| 5,328,156 A * | 7/1994 | Hoke | E04H 17/02 256/1 |
| 6,182,947 B1 * | 2/2001 | Meglino | E04H 17/066 256/32 |
| 6,561,491 B2 * | 5/2003 | Thompson | E04H 17/063 256/1 |
| 7,004,458 B1 | 2/2006 | Grubba et al. | |
| 7,118,096 B2 | 10/2006 | Petrozziello | |
| 8,272,624 B1 | 9/2012 | Frazier | |

* cited by examiner

*Primary Examiner* — Daniel Wiley
(74) *Attorney, Agent, or Firm* — Kenneth A. Roddy

(57) ABSTRACT

An edging and vegetation guard assembly includes at least one pair of elongate first and second base members each having a vertical front wall with a generally rectangular upper portion that are installed on opposed sides of the bottom of a chain link or wire mesh fence in parallel opposed relation and form a generally rectangular enclosure along the bottom of the fence which is filled with foam insulation material for preventing a mower or line of an edger from striking the fence when mowing or edging adjacent to it, and inhibit the undesirable growth of vegetation below the bottom of the fence and between the open spaces adjacent to the bottom of the fence.

8 Claims, 3 Drawing Sheets

EDGING AND VEGETATION GUARD FOR CHAIN LINK FENCES

CROSS REFERENCE TO RELATED APPLICATION

This application claims priority of U.S. Provisional Application Ser. No. 62/303,375 filed Mar. 4, 2016, the pendency of which is extended until Mar. 6, 2017 under 35 U.S.C. 119(e)(3).

BACKGROUND OF THE INVENTION

1. Field of the Invention

This invention relates generally to protective guards secured to chain link or wire mesh fences and, more particularly, to an edging and vegetation guard assembly which includes a number of elongate first and second base members having a vertical front wall and a generally rectangular upper portion that are installed in opposed relation at the bottom of a chain link or wire mesh fence and filled with an insulating foam material, for preventing a mower or line of an edger from striking the fence when mowing or edging adjacent to it and inhibiting the undesirable growth of vegetation below the bottom of the fence and between the open spaces adjacent to the bottom of the fence.

2. Background Art

A common problem with chain link and wire mesh fences is that it is extremely difficult to mow or trim the grass, weeds and vegetation below and closely adjacent to the bottom of the fence, and the line of an edger often gets wound around the wires of the fence or broken when striking the fence. Another common problem is that grass, weeds and vegetation tend to grow below the bottom of the fence and between the open spaces adjacent to the bottom of the fence.

There are many patents that disclose L-shaped, or U-shaped, guards and vegetation barriers that connect together on each side of the fence using various types of connectors. The following are several examples.

Niemann, U.S. Pat. No. 3,713,624 discloses a fence guard for restricting the growth of grass, weeds and the like directly adjacent to or beneath a fence and for preventing a mower from striking the fence when mowing directly adjacent to it. The fence guard is a length of material which is L-shaped in cross-section which is abutted against one or both sides of the fence and may be affixed together to secure them against displacement.

Johnson, U.S. Pat. No. 4,497,472, discloses a vegetation blocking fence edging assembly which includes a fence structure, a plurality of elongated edging strips, and a plurality of fence post edging structures. The fence structure includes a plurality of mounting posts between which a fencing medium extends. The edging strip has U-shaped slots at its longitudinal ends which are adapted to be received around the fence mounting posts. The edging strip includes a longitudinally extending, generally J-shaped portion made up of a U-shaped portion for receiving the lower edge of the fence medium and a single guide edge for engaging one face of the fence. Flanges extend from either side of the J-shaped portion at a downward angle to contact the ground. The flange portions are resilient plastic and bias the J-shaped portion and the U-shaped portion toward engagement with the fence lower edge. The fence post edging structure has a post engaging surface which is slightly smaller than the peripheral surface of the fence post such that it biases itself into firm engagement with the fence post periphery.

Groves, U.S. Pat. No. 4,515,349, discloses an integral fence associated vegetation barrier for eliminating growth of grass, or the like, having a base member, an integrally and upwardly extending leg arranged approximately centrally, or slightly off center thereof, projecting up a sufficient distance to allow for its tying to the bottom of any fence, incorporating a series of apertures therein to facilitate the tying of the barrier to the bottom of the fence, and also having a plurality of spatially arranged drainage openings to facilitate the flow of rain or water therethrough.

Cobler, U.S. Pat. No. 4,548,388, discloses a fence guard which utilizes first and second L-shaped panel members having vertical and horizontal leg members. The vertical leg of each panel is positioned on opposed sides of a chain-link fence with the bottom edge of the fence being positioned in a channel defined therebetween. Prior to connection of the first panel to the second panel by means of nuts, bolts, clips etc., a strip of batt insulation is placed between the bottom edge of the fence and the vertical leg of one of the panel members. Upon connection of the panels, the insulation is compressed between the panel and the fences to urge the insulation material through the open portions/interstices of the adjacent fence for contact with the interior face of the vertical leg of the opposed panel. The insulation material fills the resulting channel to preclude entry of moisture and/or sunlight on the ground beneath the fence line to inhibit the undesirable growth of vegetation between the panels and below the fence line.

Fisk, et al, U.S. Pat. No. 4,907,783, discloses a chain link fence lower edging strip which comprises an extruded flat strip of plastic having a pair of centrally molded parallel grooves that form pre-creased hinges allowing the extruded strip to be placed under a lower edge of a chain link fence and then folded upwardly into a U-shaped configuration. The outer top edges of the folded plastic strip are continuous molded fasteners that lockingly engage to a plurality of connectors passing through the openings in wire mesh of the chain link fence.

Grubba, et al, U.S. Pat. No. 7,004,458, discloses two embodiments of fence bottom shields that prevent grass and weeds from growing up through the links or low openings in a fence. The first embodiment comprises a first strip and a second strip whose bottoms are integrally connected. Two end tabs are attached to one end of the first strip and the second strip, and a tab receiving slot is defined by the opposing end of the first strip and the second strip. A plurality of screw holes are defined by holes in the end tabs and the sidewalls of the first strip and second strip. Two fence bottom shields can be joined by inserting the end tab into the tab receiving slot and inserting two screws into the screw holes. The second embodiment comprises a first strip connected to a second strip by a bottom tab inserted into a bottom slot that is secured by a bolt and nut. Two end tabs are attached to one end of the first strip and the second strip, and a tab receiving slot is defined by the opposing end of the first strip and the second strip. Two fence bottom shields can be joined by snapping together the end tabs and the tab receiving slot. In both embodiments, a fence slot is defined by the sidewalls of the first strip and second strip.

Petrozziello, U.S. Pat. No. 7,118,096, discloses a combination a fence and a protective guard. The fence has vertical posts with upper ends and at least one top support bar extending between the vertical posts. The protective guard includes a tubular member having first and second ends, an outer surface extending between the first and second ends, an inner surface extending between the first and second ends that defines an interior space, and a slot extending between the inner and outer surfaces and the first and second ends of the tubular member. The tubular member is secured over an upper edge of the fence so that the upper ends of the vertical posts and the at least one top support bar are captured within the interior space of the tubular member. In one embodiment, the combination also includes a spacer positioned between the inner surface of the tubular member and the at least one top support bar for supporting the tubular member between the vertical posts, and an insulation foam material disposed in the slot and the interior space of the tubular member for sealing the interior space of the tubular member and preventing insects, such as bees, or small animals from building nests in the tubular guard.

Frazier, U.S. Pat. No. 8,272,624, discloses a fence engageable weed barrier system which includes a fence that is mounted in and extends upwardly from a ground surface. The fence includes a fence section comprising at least one post and a dividing wall attached to and extending laterally away from the at least one post. Each of a plurality of primary barriers is positioned beneath the fence section and receives a bottom edge of the dividing wall to prevent weed growth beneath the fence section. Each of the primary barriers includes a base wall that has a top side a front edge and a back edge. A back wall is attached to and extends upwardly from the back edge. A front wall is attached to and extends upwardly from the front edge. A dividing wall receiving space is defined between the front and back walls and receives the bottom edge of the dividing wall.

SUMMARY OF THE INVENTION

The present invention is distinguished over the prior art in general, and these patents in particular by an edging and vegetation guard assembly which includes at least one pair of elongate first and second base members each having a vertical front wall with a generally rectangular upper portion that are installed on opposed sides of the bottom of a chain link or wire mesh fence in parallel opposed relation and form a generally rectangular enclosure along the bottom of the fence which is filled with foam insulation material for preventing a mower or line of an edger from striking the fence when mowing or edging adjacent to it, and inhibit the undesirable growth of vegetation below the bottom of the fence and between the open spaces adjacent to the bottom of the fence.

DETAILED DESCRIPTION OF THE INVENTION

Figure 1:
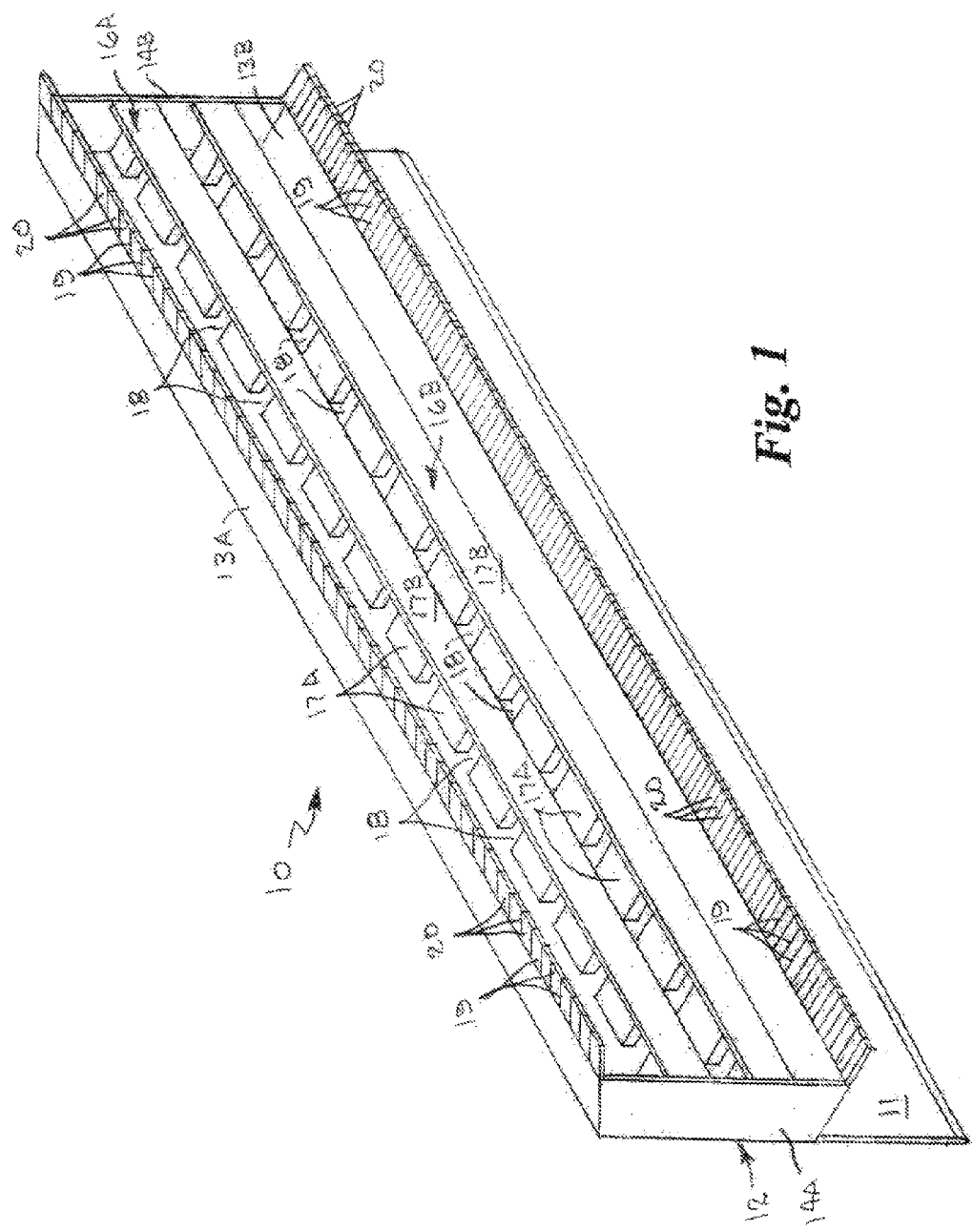
FIG. 1 is a perspective view of one of a pair of base members of the edging and vegetation guard assembly as seen from the top and back side, the other base member being a mirror image thereof.
Figure 2:
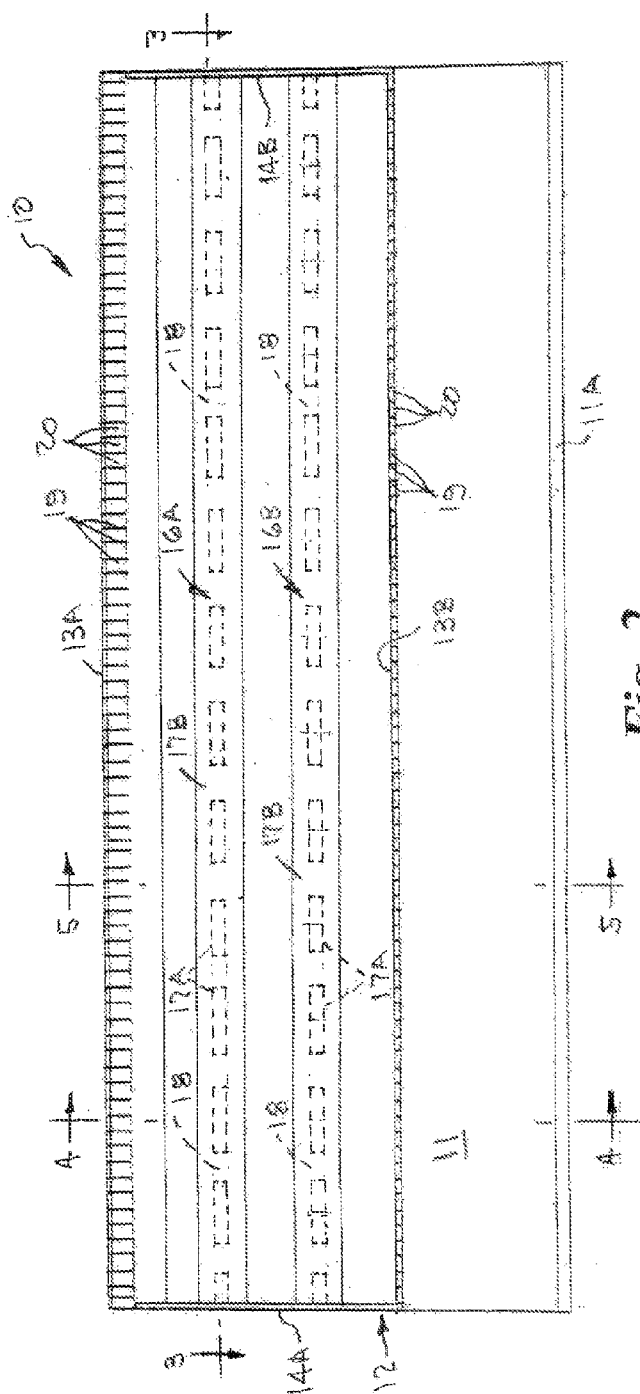
FIG. 2 is a view of the backside of the base member.
Figure 3:
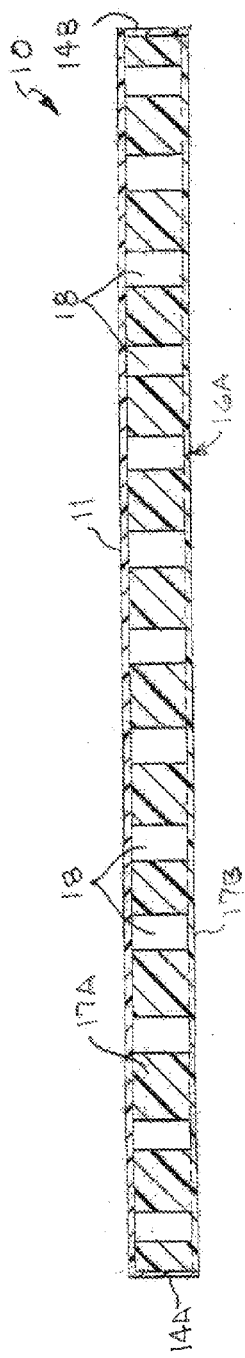
FIG. 3 is a longitudinal cross section view through the mounting rails and apertures taken along line 3-3 of FIG. 2.
Figure 5:
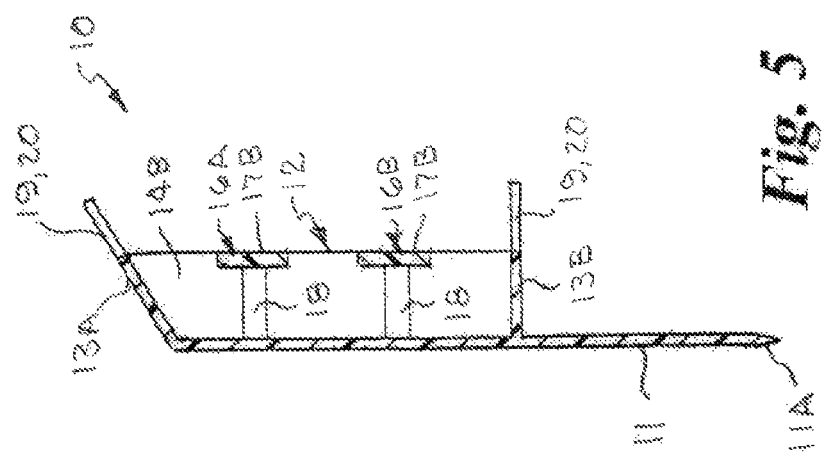
FIG. 5 is a transverse cross section view through the base member taken along line 5-5 of FIG. 2, showing the apertures in the mounting rails.
Figure 4:
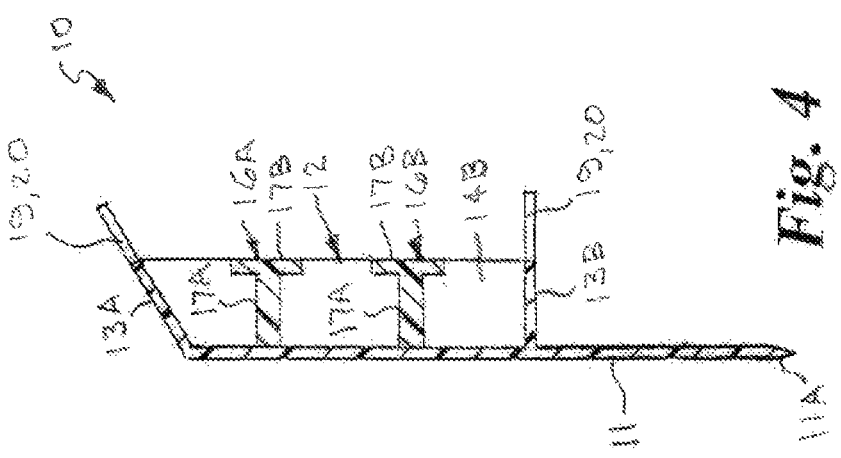
FIG. 4 is a transverse cross section view through the base member taken along line 4-4 of FIG. 2, showing the mounting rails.

Referring to FIG. 1-4 of the drawings by numerals of reference, there is shown a first base member 10 of the edging and vegetation guard assembly which is formed of a stiff plastic material configured to be installed in opposed relation to a second base member, which is identical thereto, at the bottom of a chain link or wire mesh fence. Each base member 10 has a vertical front wall 11 with a generally rectangular upper portion 12 of C-shaped transverse cross section. It should be understood that, as used herein, the term "front wall" means the wall which is disposed outwardly in relation to the fence, and the term "rearward" means in a direction toward the fence. The upper portion 12 has longitudinal top and bottom walls 13A and 13B and opposed vertical end walls 14A and 14B that extend a short distance rearward from the vertical front wall 11 defining a generally rectangular interior cavity. The longitudinal top wall 13A of the upper portion may extend rearward and upwardly at a slight obtuse angle relative to the vertical front wall 11. The vertical front wall 11 terminates a distance below the upper portion 12 in a sharp edge 11A to facilitate pushing the base member 10 into the ground surface.

An upper and a lower generally T-shaped longitudinal mounting rail 16A and 16B extend rearward from the back side of the front wall 11 and between the opposed end walls 14A and 14B in vertically spaced relation inside the generally rectangular upper portion 12. Each mounting rail 16A, 16B, has a horizontal leg portion 17A and a vertical leg portion 17B at the outer end thereof that are adjoined to the backside of the front wall 11 and to the opposed end walls 14A and 14B. The horizontal leg portion 17A of each mounting rail 16A, 16B, has series of apertures 18 extending therethrough disposed in longitudinally spaced apart relation along the length of the horizontal leg portion. Although two mounting rails are shown in the illustrated example, it should be understood that a single mounting rail may be provided.

The longitudinal top and bottom walls 13A and 13B of the upper portion 12 extend a distance rearward beyond the opposed vertical end walls 14A and 14B of the upper portion 12 and the vertical leg portion 17B of the mounting rails 16A, and 16B and are provided with a series cuts or slices 19 to define a series of adjacent flexible fingers or tabs 20 that extend along the length of the outer portion of the top and bottom walls.

When the base members 10 are installed in opposed relation on opposed sides of the bottom portion of a chain link or wire mesh fence, as described hereinafter, the vertical leg portion 17B of the mounting rails 16A and 16B will be disposed adjacent to the wire members of the fence, and a number of the flexible fingers or tabs 20 will be deflected upwardly or downwardly by the wire members, and the remaining fingers or tabs will extend through the open portions/interstices of the fence such that the opposed generally rectangular upper portions 12 form a generally rectangular interior cavity on each side of the fence which forms a generally rectangular enclosure along the bottom of the fence.

The base members 10 are installed in opposed relation along the bottom of a chain link or wire mesh fence utilizing conventional elongate pull ties or cable ties about two to three feet long which are installed about every two or three inches apart.

When the vertical leg 17B of the opposed mounting rails 16A and 16B are disposed adjacent to the wire members of the fence, the longitudinally spaced apart apertures 18 in the horizontal legs 17A of the upper and lower mounting rails are generally axially aligned in horizontal and vertically spaced relation.

The flexible strap portion of an elongate pull tie or cable tie is fed downwardly through a first pair of the generally axially vertically spaced apertures 18 in the horizontal legs 17A of the upper and lower mounting rails 16A and 16B on one side of the fence, then it is fed through the fence, and then upwardly through the opposed first pair of the vertically spaced apertures 18 in the horizontal legs 17A of the lower and upper mounting rail on the opposed side of the fence. The free end of the pull tie or cable tie is then placed through the head of the pull or cable tie, but is not pulled tight. This process is repeated at selected aligned apertures at selected locations along the length of the base members.

The generally rectangular enclosure formed by the interior cavities of the opposed generally rectangular upper portions 12 is then filled with a foam insulation material to inhibit the undesirable growth of vegetation between the below the fence line and the open spaces adjacent to the bottom of the fence.

This may be accomplished by installing a small flexible tube attached to a canister of the foam insulation down through the upper flexible fingers or tabs 20 and two of the vertically aligned apertures 18 in the mounting rails that are not being used by the pull ties, and the foam insulation is injected into the lower portion of the cavity beneath the lower mounting rail 16B. The flexible tube is then pulled upwardly and foam is injected into the middle portion of the cavity between the lower and upper mounting rails 16B and 16A. Then the flexible tube is pulled upwardly and foam is injected into the upper portion of the cavity above the upper mounting rail 16A. After the foam has filled the cavity, the free ends of the pull or cable ties are pulled tight.

When installed and filled with insulating foam material, and the foam material cures, the base members 10 form an elongate generally rectangular edging and vegetation guard for preventing a mower or line of an edger from striking the fence when mowing or edging adjacent to it, and also inhibiting the undesirable growth of vegetation below the bottom of the fence and the open spaces adjacent to the bottom of the fence.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An edging and vegetation guard assembly for installation at a bottom of a chain link or wire mesh fence to prevent a mower or line of an edger from striking the fence and inhibiting undesirable growth of vegetation below the bottom of the fence and between open spaces adjacent to the bottom of the fence, comprising:

at least one pair of elongate first and second base members formed of a stiff material, each having a vertical front wall and a generally rectangular upper portion with vertically spaced longitudinal top and bottom walls and opposed vertical end walls that extend rearward from said vertical front wall defining a generally rectangular interior cavity;

said longitudinal top and bottom walls of said upper portion extending a distance rearward beyond said opposed vertical end walls, and having a series of parallel spaced cuts defining a series of adjacent flexible tabs that extend outwardly along the length of said upper portion top and bottom walls;

said vertical front wall extending a distance below said generally rectangular upper portion and terminating in a sharp edge to facilitate pushing said first and second base members downwardly into a ground surface to reside in opposed parallel outwardly spaced relation to the bottom of the fence with said interior cavity disposed on opposed sides of the bottom of the fence, and a number of said flexible tabs are deflected upwardly or downwardly by wire members at the bottom of the fence, and the remaining tabs extend through open portions of the fence to form a generally rectangular enclosure along the bottom of the fence adapted to be filled with foam insulation material;

at least one longitudinal mounting rail disposed in said generally rectangular upper portion extending rearwardly outward from a back side of said vertical front wall and longitudinally between said upper portion opposed vertical end walls, and having a series of apertures extending therethrough in longitudinally spaced apart relation along the length thereof, said apertures adapted to receive a flexible strap portion of elongate pull ties or cable ties;

said first and second base members are adapted to be secured on opposed sides of the bottom of the fence by feeding a free end of the flexible strap portion of the pull tie or cable tie through selected apertures of said mounting rail, through selected openings between members of the fence, and then securing the free end to a head of the pull tie or cable tie; and said generally rectangular enclosure along the bottom of the fence formed by said interior cavity of said base members on opposed sides of the bottom of the fence and said flexible tabs is adapted to be filled with a foam insulation material through a tube placed through said flexible tabs and then removed to allow said foam insulation to cure.

2. The edging and vegetation guard assembly according to claim 1, wherein said longitudinal top wall of said upper portion of each of said base members extends rearward and upwardly at an obtuse angle relative to said vertical front wall.

3. The edging and vegetation guard assembly according to claim 1, wherein said at least one longitudinal mounting rail comprises two longitudinal mounting rails disposed in said generally rectangular upper portion extending rearwardly outward from a back side of said vertical front wall and longitudinally between said upper portion opposed end walls in vertically spaced relation.

4. The edging and vegetation guard assembly according to claim 1, wherein said at least one longitudinal mounting rail is a generally T-shaped member having a horizontal leg portion adjoined to the backside of said vertical front wall, and said series of apertures extend along the length of said horizontal leg portion.

5. The edging and vegetation guard assembly according to claim 1, wherein the free end of the flexible strap portion of the pull tie or cable tie is fed though the head of the pull tie or cable tie prior to filling said generally rectangular enclosure along the bottom of the fence with the foam insulation material, and thereafter pulled tight.

6. A method for preventing a mower or line of an edger from striking the bottom of a chain link or wire mesh fence and inhibiting undesirable growth of vegetation below the bottom of the fence and between open spaces adjacent to the bottom of the fence, comprising:

providing at least one pair of elongate first and second base members formed of a stiff material, each having a vertical front wall and a generally rectangular upper portion with vertically spaced longitudinal top and bottom walls and opposed vertical end walls that extend rearward from said vertical front wall defining a generally rectangular interior cavity, the longitudinal top and bottom walls extending a distance rearward beyond said opposed vertical end walls, and having a series of parallel adjacent flexible tabs that extend outwardly along the length of the upper portion top and bottom walls, the vertical front wall extending a distance below the generally rectangular upper portion and terminating in a sharp edge, and at least one longitudinal mounting rail disposed in the generally rectangular upper portion extending rearwardly outward from a back side of the vertical front wall and longitudinally between the upper portion opposed vertical end walls, and having a series of apertures extending therethrough in longitudinally spaced apart relation along the length thereof;

pushing the first and second base members downwardly into a ground surface to reside in opposed, parallel, outwardly spaced relation to the bottom of the fence with the interior cavity of said base members disposed on opposed sides of the bottom of the fence such that a number of the flexible tabs are deflected upwardly or downwardly by wire members at the bottom of the fence, and the remaining tabs extend through open portions of the fence to form a generally rectangular enclosure along the bottom of the fence;

securing the first and second base members on opposed sides of the bottom of the fence by feeding a free end of a flexible strap portion of a pull tie or cable tie through selected apertures of the mounting rail, through selected openings between members of the fence, and then securing the free end to a head of the pull tie or cable tie; and filling the generally rectangular enclosure along the bottom of the fence formed by the interior cavity of the base members' insulation material and allowing it to cure.

7. The method according to claim 6, wherein the free end of the flexible strap portion of the pull tie or cable tie is fed though the head of the pull tie or cable tie prior to filling the generally rectangular enclosure with foam insulation material, and thereafter pulled tight.

8. The method according to claim 6, wherein the step of filling the generally rectangular enclosure with foam insulation material is carried out by injecting the foam insulation material through a tube placed through the flexible tabs and thereafter removed to allow the foam insulation to cure.

\* \* \* \* \*